(No Model.) 4 Sheets—Sheet 1.
J. P. VAN WYCK.
DUMPING WAGON.
No. 414,093. Patented Oct. 29, 1889.
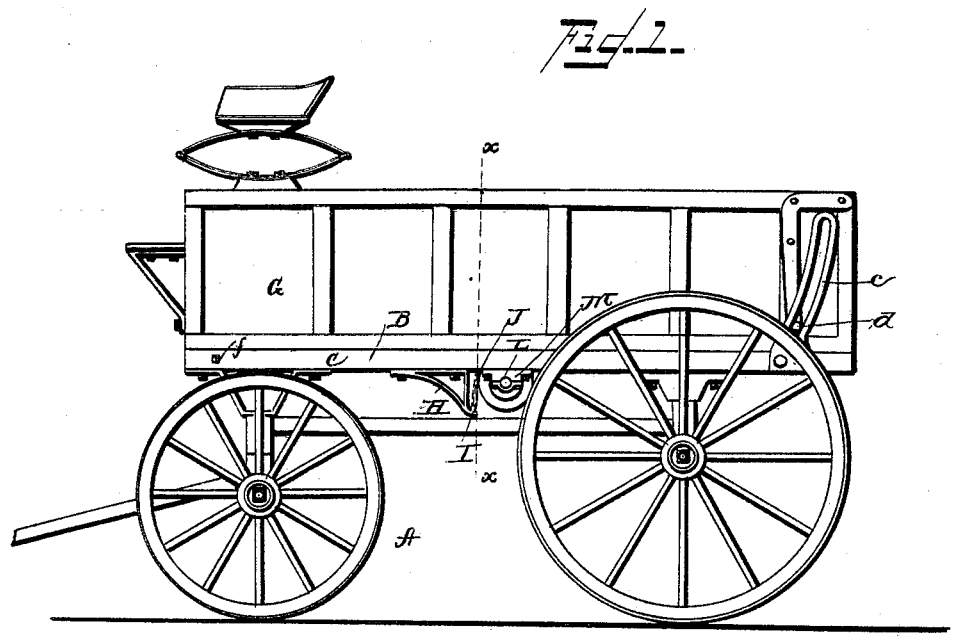
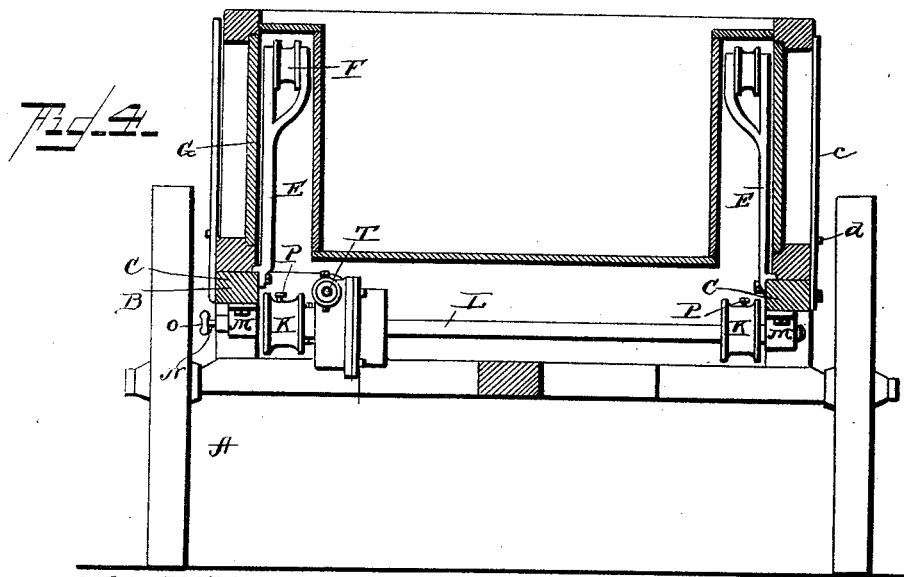
WITNESSES:
F. L. Ourand
C. F. Chisholm
INVENTOR:
James P. Van Wyck
by Bonis Dagger & Co.
Attorneys (No Model.) 4 Sheets—Sheet 2.

J. P. VAN WYCK.
DUMPING WAGON.

No. 414,093. Patented Oct. 29, 1889.

WITNESSES:
F. L. Durand
C. F. Chisholm

INVENTOR:
James P. Van Wyck
By Bairs Dagger & Co.
Attorneys.

(No Model.) 4 Sheets—Sheet 3.

J. P. VAN WYCK.
DUMPING WAGON.

No. 414,093. Patented Oct. 29, 1889.

WITNESSES:
F. L. Durand
C. F. Chisholm

INVENTOR:
James P. Van Wyck,
By Louis Bagger & Co.
Attorneys.

(No Model.)   4 Sheets—Sheet 4.
J. P. VAN WYCK.
DUMPING WAGON.

No. 414,093.  Patented Oct. 29, 1889.

WITNESSES:
F. L. Ourand
C. F. Chisholm

INVENTOR:
James P. Van Wyck,
by Soues Bagger & Co.,
Attorneys.

UNITED STATES PATENT OFFICE.

JAMES POLHEMUS VAN WYCK, OF HUDSON, NEW YORK.

DUMPING-WAGON.

SPECIFICATION forming part of Letters Patent No. 414,093, dated October 29, 1889.

Application filed July 24, 1889. Serial No. 318,544. (No model.)

*To all whom it may concern:*

Be it known that I, JAMES POLHEMUS VAN WYCK, a citizen of the United States, and a resident of Hudson, in the county of Columbia and State of New York, have invented certain new and useful Improvements in Dumping-Wagons; and I do hereby declare that the following is a full, clear, and exact description of the invention, which will enable others skilled in the art to which it appertains to make and use the same.

Figure 2:
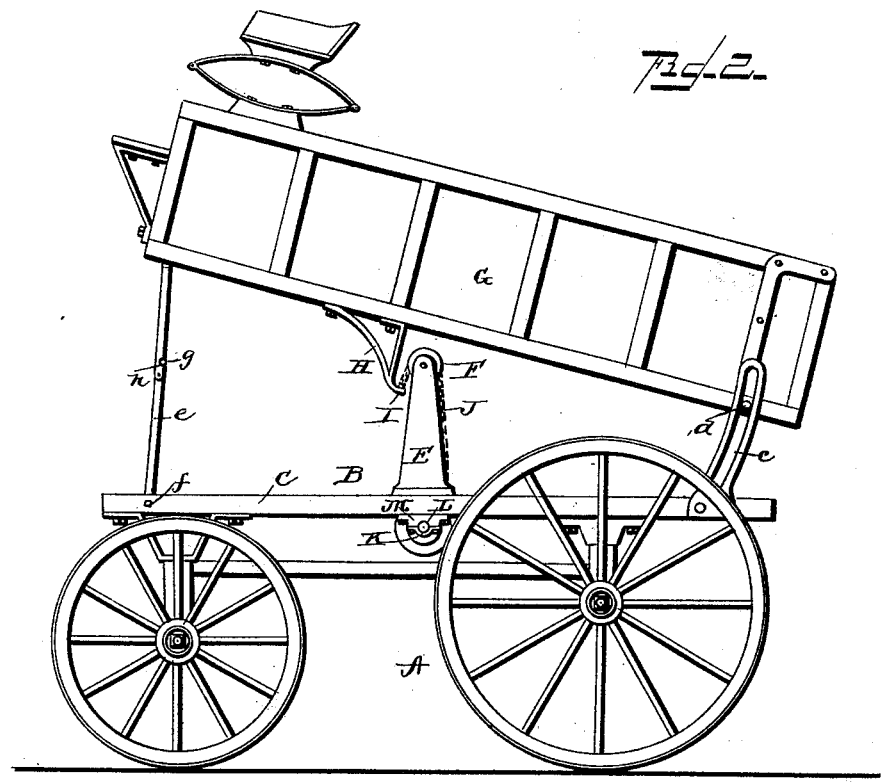
Figure 6:
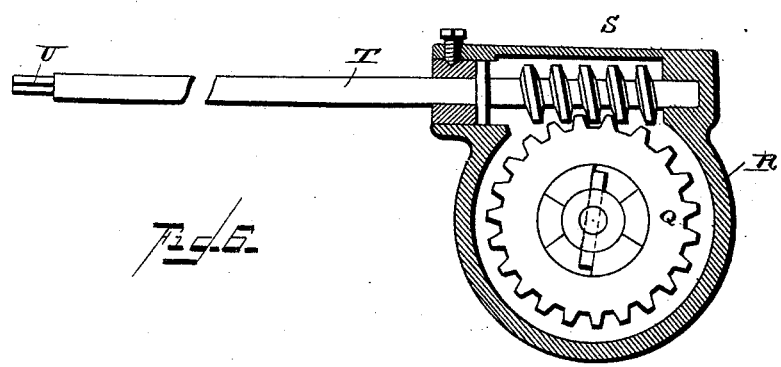
Figure 3:
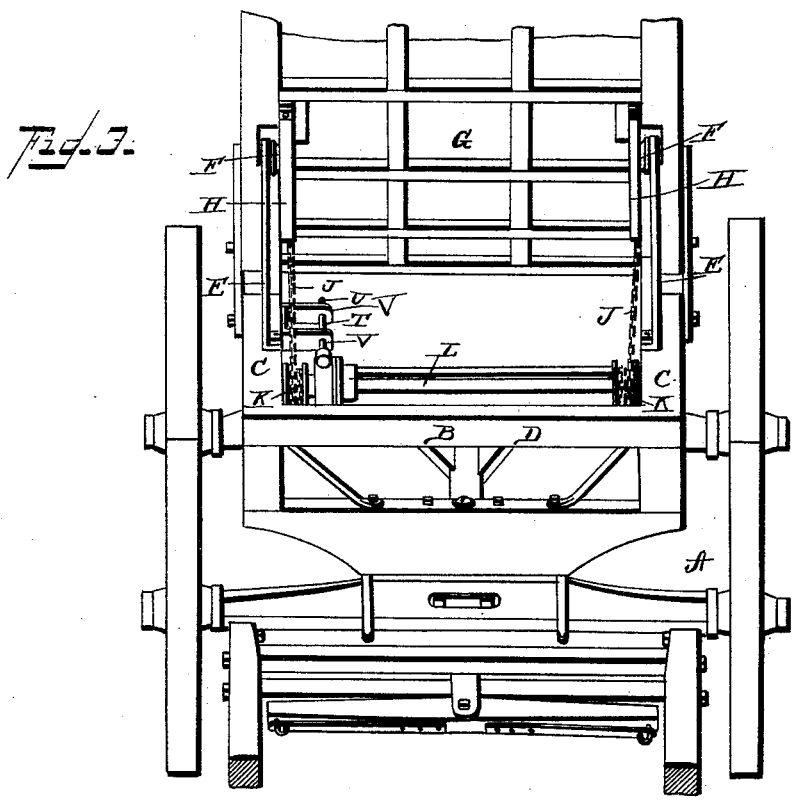
Figure 5:
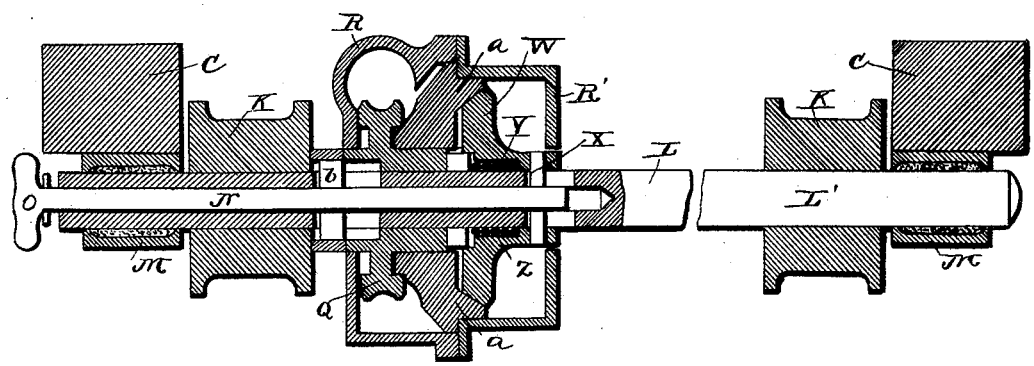
Figure 7:
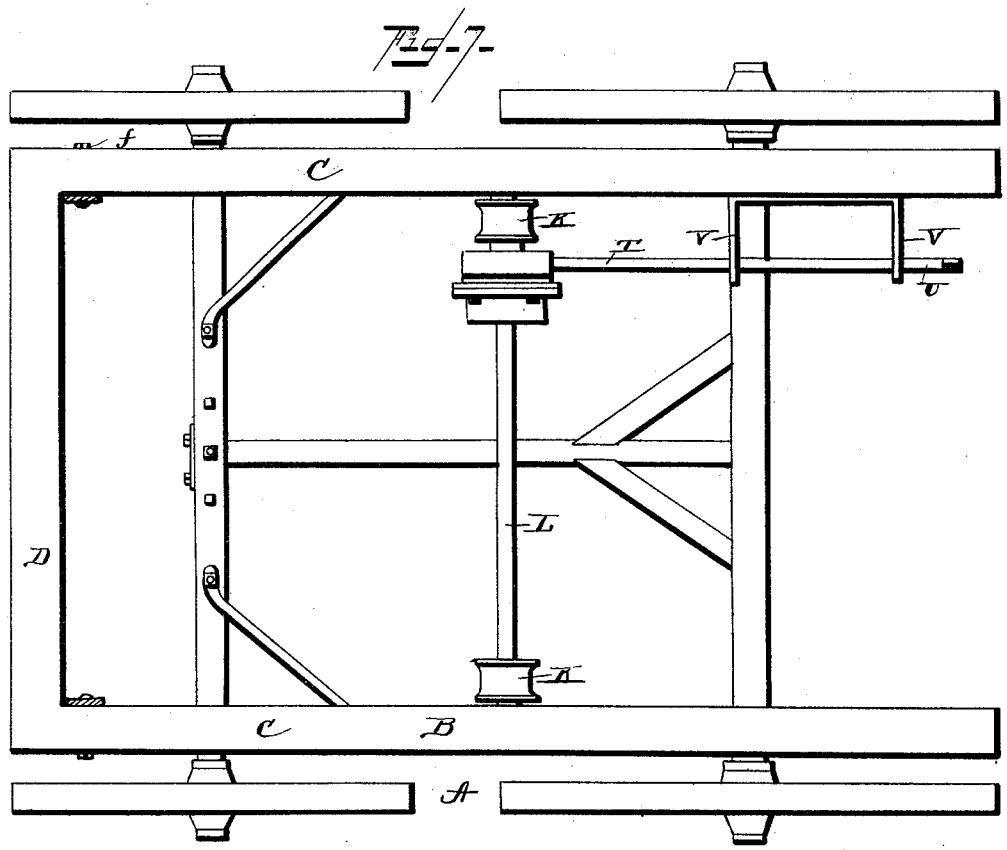
Figure 8:
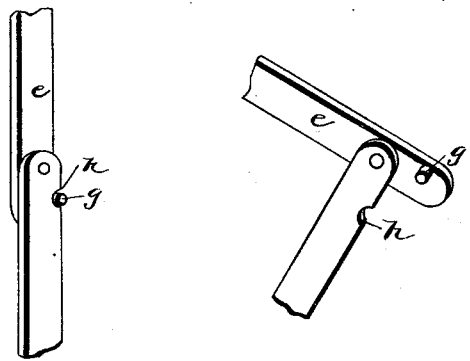

Figure 1 is a side view of my improved dumping-wagon, showing the wagon-box in its normal or lowered position. Fig. 2 is a similar view of the wagon, showing the box in its elevated position ready for dumping the load. Fig. 3 is a front view of the wagon with the box elevated as in Fig. 2. Fig. 4 is a vertical transverse sectional view on line $x\ x$ in Fig. 1, looking toward the back part of the wagon. Fig. 5 is a longitudinal sectional view of the friction-gear and shaft, &c., for elevating the wagon-box. Fig. 6 is a detail view of the worm-gear for revolving the shaft. Fig. 7 is a top or plan view of the frame which supports the box, showing the operating-shaft and gears with their appurtenances; and Fig. 8 is a detail view of the front braces.

Like letters of reference denote corresponding parts in all the figures.

This invention has relation to that class of dumping-wagons in which the wagon-box containing the load to be dumped is capable of being raised or elevated and then tilted to one end or side, so that its bottom will form an inclined plane at such an angle that the load or contents of the box will slide out upon removing the end-gate or one of the sides of the box, according to whether the wagon is designed to dump or discharge its load endwise or sidewise.

This class of dumping-wagons as heretofore constructed has been operated by means of intermeshing cog-wheels and levers, the employment of which involves considerable friction and expenditure of power in order to elevate the box and its load and pitch it at the proper angle; and one of the objects of my invention is to simplify the construction of the elevating-gear, so that the same may be operated with a minimum of power, and also to so construct the various co-operating parts as to produce a dumping-wagon which, while comparatively simple and inexpensive in construction, shall yet be sufficiently strong and durable to withstand rough usage.

Another object aimed at is to so construct the elevating-gear and its appurtenances that the same may be applied to wagons of the ordinary construction already in use, as well as to the box-cars or gravel-cars used in the construction of railways.

With these several objects in view my invention consists in the detailed construction and combination of parts of the dumping-wagon, which will be hereinafter more fully described and claimed.

Reference being had to the accompanying four sheets of drawings, the letter A designates the running-gear, which may be of any desired construction. This running-gear supports the bottom frame B, comprising the parallel side sills C C and front piece D. Upon the side sills C are bolted—one on each side—the standards E E, the upper ends of which form bearings for the grooved sheaves or pulleys F.

The wagon-body G is provided on its under side with depending brackets or hangers H— one on each side—of the shape shown in the drawings, and bent at their lower ends to form hooks I, in which one end of the hoisting-chain (shown at J) is fastened. The other end of this chain (of which, of course, there is one on each side) passes over its appropriate grooved sheave F, down along its appropriate standard E, to and around its appropriate drum K on the hoisting-shaft L. The latter is journaled in boxes or bearings M upon the side sills C of the bottom frame, and is constructed as shown more clearly in the sectional view Fig. 5. From this it will be seen that one end of said shaft (marked L′) is solid, while the other end is bored through centrally, so as to form a tube for the insertion of the sliding rod N, the projecting outer end of which is provided with a handle O. The winding-drums K K are fastened by means of keys or other suitable devices upon opposite ends of the shaft L L′, just inside of the side sills, as shown in the drawings, and are provided with screws or bolts P for the attachment of the lower ends of the hoisting-chains J.

By reference to Figs. 5 and 6 it will be seen that the shaft L is provided with a cog-wheel Q, covered by a box or casing R and meshing with the worm S upon the worm-shaft T, the outer end of which is provided with a square tenon U, adapted to receive a winch-handle or crank for turning it. The worm-shaft T is journaled in brackets or bearings V V, affixed to the inner sides of one of the side sills C, as will appear more clearly by reference to Figs. 3 and 7 of the drawings. Thus it will be seen that when the worm-shaft T is rotated it will revolve the intermeshing cog-wheel Q, thereby revolving shaft L L', thus winding the hoisting-chains J around their appropriate drums, and thereby elevating the wagon-box into the dumping position illustrated in Fig. 2.

The box R, covering the worm S and its intermeshing gear-wheel or cog-wheel Q, is provided on its open side with a cover R', within which is placed the beveled friction-wheel W, which is fastened upon shaft L L', so as to revolve with it, by means of a pin or key X, engaging a slot or recess in the hub of the wheel. The latter has a central recess Y encircling the shaft L, and within this recess is placed a coiled spring Z. The rod N works loosely in the central bore of the tubular part of the shaft, permitting it to slide forward and back, and the key X is inserted through a slot at the inner end of said rod. Under normal conditions the coiled spring Z will operate to separate the beveled friction-wheel W from the beveled friction cup or brake a, located within box R; but by pulling upon the projecting handle O spring Z will be compressed, so as to bring the beveled periphery of the friction-wheel W in frictional contact with the brake-cup or friction-cup a, which position is illustrated in Fig. 5. Another key b is inserted through a slot in rod N and through corresponding slots in shaft L, the slots in the shaft being of sufficient length to allow the key sufficient play forward and back to operate the friction-wheel W in the manner described, so that while rod N may be pulled forward or back to a limited extent, but sufficient to engage or disengage the friction-wheel W from its friction cup or brake a, yet the centrally-sliding rod and the tubular shaft within which it works will revolve together.

From the foregoing description, taken in connection with Fig. 5, it will be seen that when the parts are in their normal condition and the worm S is being revolved shaft L L' will also revolve, thereby revolving the hoisting-drums K K and raising or lifting the wagon-box; but when after the load has been dumped or discharged it is desired again to lower the box this may be accomplished by pulling upon the handle O just enough to get the requisite friction between the friction-wheel W and friction-cup a to prevent the box from being lowered too fast or too suddenly. By simply regulating the pull upon rod N the amount of friction may be regulated to a nicety, so as to lower the box evenly and smoothly without any sudden jar or concussion.

In order to guide the wagon-box while it is being raised or lowered, I provide the rear end of the bottom frame with curved guides c—one at each side—which are slotted to receive bolts d, affixed in the bottom of the wagon box or body and traveling in said slotted guides. The opposite or forward end of the wagon-box is provided with jointed braces e, the lower ends of which are pivoted upon bolts f in the forward ends of the side sills. These jointed braces e are so constructed that they can be doubled in one direction only—viz., inwardly toward the rear end of the wagon—one of the jointed parts being provided with a projecting shoulder g, bearing against a corresponding recess h in the opposite part in substantially the same manner as the blade of a jackknife is pivoted in its handle, and from this construction it follows that the two parts of the jointed braces can be folded or doubled upon each other in lowering the wagon-box only in the direction of the rear end of the wagon, as indicated by dotted lines in Fig. 2. From this construction it results that after the hoisting-drums have been revolved until the hoisting-chains J shall have elevated the wagon-box into the position shown in Fig. 2 the box will of itself resume the rearwardly-inclined position illustrated in this figure, the center of gravity being toward the rear side of the brackets or hangers H, to which the hoisting-chains are attached, these hangers or brackets permitting the bottom of the box to be raised or lifted entirely clear of the upper ends of the standards E, so that the box will readily tip itself into the inclined position shown in the drawings, so that by removing the end-gate the load will be dumped. After this has been accomplished the wagon-box is again lowered into its normal position simply by pulling upon the handle O until sufficient friction has been attained to enable the box to lower itself easily and gradually, the jointed braces at the same time folding inwardly and doubling upon themselves, while during the lowering of the box the same is maintained in its proper position by means of the slotted guides c.

If it is desired to dump the load sidewise instead of endwise, the hoisting and lowering mechanism is simply located upon the bottom frame at right angles to the position shown in the drawings, when it follows that the wagon-box will be tilted or inclined in a sidewise direction instead of endwise. The latter construction may be employed to advantage on railway-cars or gravel-cars for dumping ballast or gravel upon railways during the construction or repairing of the same, and by elevating and tilting the wagon-box gradually the load may be dumped or discharged in installments, or little by little, as required.

From the foregoing it will be seen that the construction of my elevating and lowering apparatus is of such a nature that it involves but few parts, and that these may be applied to any wagon of ordinary construction simply by providing the running-gear with a rectangular bottom frame or support. The whole apparatus may therefore be manufactured and supplied to the trade, the solid part of the shaft L L' being made of sufficient length to be used on wagons having comparatively wide beds. In order to properly adjust the shaft to a narrower bed, all that is necessary is to cut off a sufficient portion of the slotted end of the shaft to answer the purpose and adjust the position of the hoisting-drum K upon the shortened end of the shaft accordingly.

If desired, the entire operating-gear may be covered by a hood or casing of sheet metal for the purpose of keeping out coal-dust or dirt, &c.

Having thus described my invention, I claim and desire to secure by Letters Patent of the United States—

The combination of the bed or bottom frame having side standards E and bearings or boxes for the revolving shaft L L', the hoisting-shaft L L', constructed as described, and provided with hoisting-drums K K, the hoisting-chains J, the movable wagon box or body provided with the hangers H, the curved end guides c, adapted to engage guide-bolts projecting from opposite sides of the wagon box or body, and the forward jointed braces e, all constructed and combined to operate substantially in the manner and for the purpose shown and set forth.

In testimony that I claim the foregoing as my own I have hereunto affixed my signature in presence of two witnesses.

JAMES POLHEMUS VAN WYCK.

Witnesses:
W. H. BROWNING,
FREDERICK J. COLLIER.